(12) United States Patent
Feld et al.

(10) Patent No.: US 7,792,029 B2
(45) Date of Patent: Sep. 7, 2010

(54) NETWORK DATA TRANSMISSION BASED ON PREDEFINED RECEIVE TIMES

(75) Inventors: Joachim Feld, Nürnberg (DE); Günter Steindl, Poppenricht (DE); Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1400 days.

(21) Appl. No.: 10/789,069

(22) Filed: Feb. 27, 2004

(65) Prior Publication Data

US 2004/0217878 A1    Nov. 4, 2004

(30) Foreign Application Priority Data

Feb. 28, 2003    (DE) ................... 103 08 954

(51) Int. Cl.
*G08C 15/00*    (2006.01)
(52) U.S. Cl. .................................. 370/230.1
(58) Field of Classification Search ............ 370/395.42
See application file for complete search history.

(56) References Cited

U.S. PATENT DOCUMENTS

| | | | | |
|---|---|---|---|---|
| 4,642,758 A * | 2/1987 | Teng | ............................ | 707/10 |
| 4,837,856 A | 6/1989 | Glista, Jr. | | |
| 5,003,531 A | 3/1991 | Farinholt et al. | | |
| 5,043,982 A * | 8/1991 | Werner | ........................ | 370/507 |
| 5,157,659 A * | 10/1992 | Schenkel | ..................... | 370/447 |
| 5,179,548 A | 1/1993 | Sandesara | | |
| 5,301,193 A * | 4/1994 | Toyofuku et al. | ......... | 370/395.4 |
| 5,557,608 A * | 9/1996 | Calvignac et al. | ............ | 370/389 |
| 5,935,267 A * | 8/1999 | Hayakawa | .................... | 714/748 |
| 5,960,001 A * | 9/1999 | Shaffer et al. | ................ | 370/448 |
| 5,970,062 A * | 10/1999 | Bauchot | ................... | 370/310.2 |
| 6,028,843 A * | 2/2000 | Delp et al. | ................... | 370/235 |
| 6,151,298 A | 11/2000 | Bernhardson et al. | | |
| 6,301,262 B1 * | 10/2001 | Peterson | ..................... | 370/458 |
| 6,457,081 B1 * | 9/2002 | Gulick | ........................ | 370/428 |
| 6,570,852 B1 * | 5/2003 | Suzuki | ........................ | 370/235 |
| 6,611,886 B1 * | 8/2003 | Lee et al. | ....................... | 710/45 |
| 6,810,442 B1 * | 10/2004 | Lin et al. | ....................... | 710/22 |
| 7,085,849 B1 * | 8/2006 | Clark et al. | .................. | 709/234 |
| 7,340,545 B2 * | 3/2008 | Riley | ........................... | 370/458 |
| 7,352,708 B1 * | 4/2008 | Hauck et al. | ................. | 370/257 |
| 2001/0002195 A1 | 5/2001 | Fellman et al. | | |
| 2001/0033581 A1 * | 10/2001 | Kawarai et al. | ............. | 370/468 |
| 2002/0087716 A1 | 7/2002 | Mustafa | | |
| 2002/0172215 A1 * | 11/2002 | Hekstra-Nowacka | ........ | 370/437 |
| 2004/0205206 A1 * | 10/2004 | Naik et al. | ................... | 709/230 |

FOREIGN PATENT DOCUMENTS

| | | |
|---|---|---|
| DE | 100 58 524 A1 | 6/2002 |
| GB | 2187917 A | 9/1987 |
| WO | 0011820 A1 | 3/2000 |
| WO | WO 03/036832 A2 | 5/2003 |
| WO | WO 03/036832 A3 | 5/2003 |

\* cited by examiner

*Primary Examiner*—Ayaz R Sheikh
*Assistant Examiner*—Timothy J Weidner

(57) ABSTRACT

Method and a system for transmitting data in a switchable data network. To improve the transmission of data having different priorities in the switchable data network, telegrams are assigned priorities, with said telegrams (70-77) in each case having a beginning and an end. Data telegrams assigned a first priority are sent during a first phase from first users to second users, with the first phase being characterized by a defined receive time of the end of one or more of the data telegram at one or more second users.

20 Claims, 3 Drawing Sheets ly in advance. The injection of the data telegrams at the original sender's side and the forwarding of said telegrams by means of the switching units involved takes place on a time-controlled basis. Through buffering in the respective switching units it is accomplished that any internet-enabled non-realtime-critical communication spontaneously occurring at any time is shifted into that transmission sector of a transmission cycle which is provided for the non-realtime-critical communication and is also only transmitted there.

NETWORK DATA TRANSMISSION BASED ON PREDEFINED RECEIVE TIMES

CROSS REFERENCE TO RELATED APPLICATIONS

This application claims priority to the German application No. 10308954.3 DE, filed Feb. 28, 2003 and which is incorporated by reference herein in its entirety.

FIELD OF INVENTION

The invention relates to a system and method for transmitting data in a switchable data network, and to a user in a switchable data network, in particular switched Ethernet.

BACKGROUND OF INVENTION

Data networks facilitate communication between several users by networking the individual users, which is to say by connecting them to each other. Communication here refers to the transmission of data between the users. The data being transmitted is sent in the form of data telegrams, which is to say said data is assembled into packets and sent to the relevant recipient in that form over the data network. The term "data packets" is accordingly also employed. In this document the terms "transmitting data" and "transmission of data" are used fully synonymously with the above mentioned transmission of data telegrams or of data packets. Networking itself is achieved, for example in the case of switchable high-performance data networks, in particular Ethernet, by switching in each case at least one switching unit between two users which is connected to both users. Each switching unit can be connected to more than two users. Users are each connected to at least one switching unit, but not directly to another user. Users are, for example, computers, stored-program controls (SPS), or other components which exchange electronic data with other components and, in particular, process it. Switching units are, for example, what are termed switches, hubs, bridges, routers, and the like. In contrast to bus systems, where users can each reach any other data network user directly over the data bus, the switchable data networks exclusively contain point-to-point connections, which is to say a user can only reach all other users in the switchable data network through forwarding by means of one or more switching units of the data being transmitted. In distributed automation systems, for example in the area of drive engineering, specific data must arrive at the intended users' location and be processed by the recipients at specific times. This is referred to as realtime-critical data or data traffic, because failure of the data to arrive at its destination at the due time will have undesired consequences for the user.

DE 100 58 524 A1 describes a system and a method facilitating both realtime-critical and non-realtime-critical communication in a switchable data network consisting of users and switching units, for example of a distributed automation system, by means of a cyclical operating mode. In what is termed a transmission cycle, for all users and switching units of the switchable data network there is in each case at least one sector for transmitting realtime-critical and at least one sector for transmitting non-realtime-critical data, as a result of which the realtime-critical communication is separated from the non-realtime-critical communication. As all users and switching units are always synchronized with a common time base, the respective sectors for transmitting data occur in each case at the same time for all users and switching units, which is to say the realtime-critical communication takes place simultaneously independently of the non-realtime-critical communication and so is not influenced by it. The realtime-critical communication is planned in advance. The injection of the data telegrams at the original sender's side and the forwarding of said telegrams by means of the switching units involved takes place on a time-controlled basis. Through buffering in the respective switching units it is accomplished that any internet-enabled non-realtime-critical communication spontaneously occurring at any time is shifted into that transmission sector of a transmission cycle which is provided for the non-realtime-critical communication and is also only transmitted there.

SUMMARY OF INVENTION

The object of the invention is to improve the transmission in a switchable data network of data having a different priority.

Said object is achieved by means of a method for transmitting data in a switchable data network whereby data telegrams are assigned priorities, with said telegrams in each case having a beginning and an end, with data telegrams that were assigned a first priority being sent during a first phase from first users to second users, with the first phase being characterized by means of a defined receive time of the end of the respective data telegram at the second user.

Said object is achieved by means of a system for transmitting data in a switchable data network with users which have means for sending, receiving, and/or forwarding data telegrams, with said telegrams in each case having a beginning and an end, and with said telegrams being assigned priorities, with first users being provided during a first phase for sending data telegrams assigned a first priority to second users, with the first phase being characterized by a defined receive time of the end of the respective data telegram at the second user.

Said object is achieved by means of a user in a switchable data network having means for sending, receiving, and/or forwarding data telegrams, with said telegrams in each case having a beginning and an end, and with said telegrams being assigned priorities, with the user being embodied as the first or second user, with the first user being provided during a first phase for sending data telegrams assigned a first priority to second users, with the first phase being characterized by a defined receive time of the end of the respective data telegram at the second user.

The invention is based on the knowledge that the transmitting of data telegrams assigned different priorities within a switchable data network results in unsatisfactory results if the data telegrams are not suitably transmitted in a sequence depending on the respectively assigned priority. Differences in the length of those data telegrams assigned a highest priority in particular result in partially considerable delays in the transmission of data telegrams of next-lower priority. According to the invention, a first phase is defined during which those data telegrams assigned a first priority are transmitted between the users, said first phase being characterized by a defined receive time of the end of the respective data telegram at the receiving user. In contrast to the prior art, the first phase is therefore not characterized by a rigidly fixed start time the consequence of which is that the receive times of the telegram ends are distributed over time in an uncoordinated manner depending on the respective telegram length. According to the invention, the first phase is instead characterized by a defined receive time of the end of the respective data telegram at the receiving user, where the term "defined receive time" is to be understood as a pre-specified and planned receive time which is known in the system and which has been coordinated among the users. The defined receive time of the end of the respective data telegram thus results in optimized planning of the transmission in a switchable data network of data having different priority, whereby the end of the first phase is defined on a coordinated basis between the users.

According to an advantageous embodiment of the invention, only data telegrams assigned a second priority are sent in a second phase after the end of the first phase. The advantage of this is that, after highest-priority data telegrams sent in the first phase, data telegrams assigned the next-lower priority can preferably be sent in the second phase. The transmission of lower-priority data telegrams which could otherwise impede the transmission of the higher-priority data telegrams is thus avoided during this second phase. On completion of the first phase, a second phase, namely the waiting time, is thus started during which lower-priority data telegrams can continue being blocked, but higher-priority data telegrams are let through. Said waiting time is advantageously selected to be of the same length as the overall time for forwarding a data telegram from the user at the beginning of a transmission link to the user at the end of a transmission link within the data network. This embodiment of the invention thus enables higher-priority data telegrams to be channeled through a switchable data network without any special planning requirements and with modest expenditure.

To facilitate the transmission and forwarding of lower-priority data telegrams within the data network, according to a further advantageous embodiment of the invention, data telegrams assigned any priority are sent in a third phase after the end of the second phase. A third phase for transmitting data telegrams of any priority is thus made available after data telegrams having a high and highest priority have been sent in the second or, as the case may be, first phase.

According to a further advantageous embodiment the invention can perform cyclical communication tasks within a switchable data network if the first phase is cyclically repeated. A cycle expediently ends or, as the case may be, begins at the time of the defined end of the first phase, which is to say at the defined receive time of the end of the respective data telegram at the receiving user.

To make the transmission of data, in particular realtime data, within a data network as calculable as possible, according to a further embodiment of the invention, data telegrams with realtime data are assigned the first priority.

BRIEF DESCRIPTION OF THE DRAWINGS

The invention is described and explained in more detail below with reference to the exemplary embodiments shown in the figures, in which.

DETAILED DESCRIPTION OF INVENTION

Figure 1:
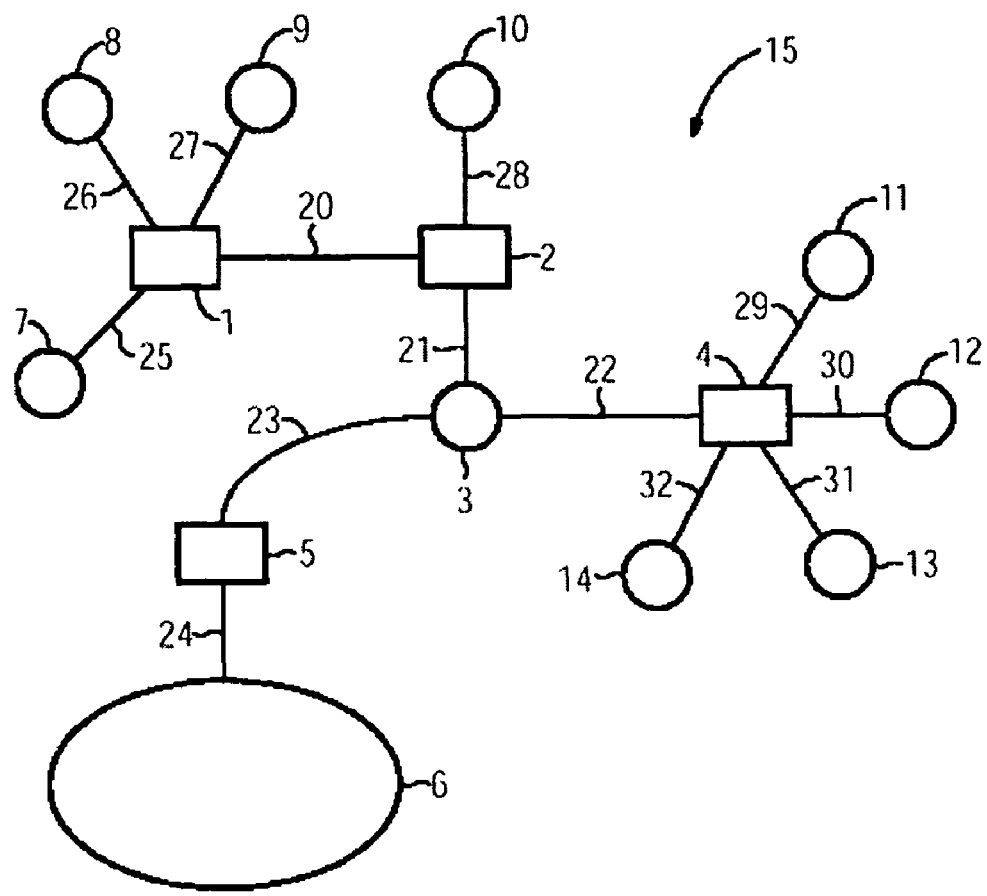
FIG. 1 is a schematic of a switchable data network.

FIG. 1 is a schematic of a switchable data network 15. The data network has users 1-14 among all of which a communication coupling exists over communication connections 20-32. Users 1-14 in data network 15 are switching elements (users 1-5), what are termed switches, for instance, an intra-/internet (user 6), and other users 7-14, for instance components of an automation system, which can communicate with each other and with other components over data network 15. Data network 15 is a switched network, which is to say that in contrast to what is termed a shared-medium network the communication participants in network 15 do not communicate with each other over a shared communication medium but over point-to-point communication connections 20-32. In the exemplary embodiment, communication in data network 15 is coordinated by users 1-5 embodied as switching elements such as switches, for instance. A switch customarily has means for sending, receiving, and/or forwarding data telegrams, in particular input ports with input buffers, a switch matrix, output ports with output buffers, an address/port assignment table, switch control software, and switch management software. There is a resulting difference in the behavior of the switch depending on the principle and implementation of these elements. A switch generally serves as a very fast packet switching system. A packet or a telegram arriving at an input port is switched through on the basis of its destination address to the correct output port in unmodified form. The switch analyzes the packet on its arrival, decides on the basis of a stored address table to which output port the packet belongs, and dispatches it over this output port as soon as possible. Switches are customarily optimized for speed. As many elements as possible are for this reason implemented in the form of fast hardware (in contrast to routers, which are predominantly software implementations). In the exemplary embodiment, user 1 forwards data packets coming from users 7-9 over communication connection 20 to user 2. Vice versa, data packets coming from user 2 are forwarded by user 1 to the single user or the respectively addressed users 7-9. Users 1-5 forward the data telegrams sequentially, which is to say one after the other. Switched data network 15 can be connected via suitable switching elements to shared-medium networks and/or an intra/internet 6.

Realtime communication is subject in automation systems to varying requirements. As an instance of this, updating times, for example, or, as the case may be, response times may at the most be in the range of a few milliseconds. The term 'updating time' is to be understood here as the length of time required to form a variable in an application of a user 1-14, to send said variable to another user 1-14 over a communication connection 20-32, and to make said variable available there in the application. The following factors are customarily responsible for the updating rate between two users 1-14. The updating rate is inversely proportional to the throughput time of data or, as the case may be, telegrams between users 1-14. The throughput time comprises the time taken to make the data available in sending user 1-14, the time taken to process the respective communication tag in sending user 1-14, the time taken for transmission over the communication connection 20-32, the time taken to process the communication tag in receiving user 1-14, and the time taken to process the receiving [sic] data in user 1-14.

Figure 2:
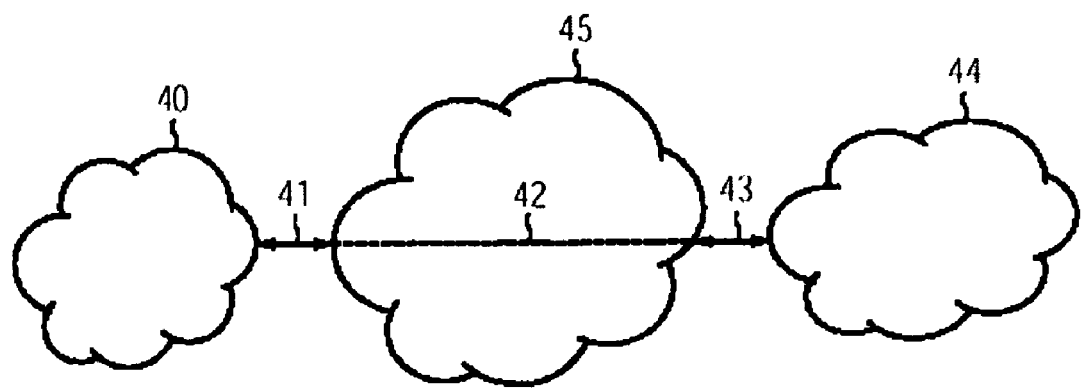
FIG. 2 is a schematic of the routing of soft realtime data through an isochronous realtime network.

FIG. 2 is a schematic of the routing of what is termed soft realtime data (SRT data) through an isochrones realtime network (IRT network). An IRT system is described, for example, in the above-mentioned DE 100 58 524 A1. IRT communication is here characterized by the fact that for all users and switching units of the switchable data network in each case at least one sector for transmitting realtime-critical and at least one sector for transmitting non-realtime-critical data are provided in a transmission cycle. The realtime-critical data provided for transmitting in this first sector is referred to below as IRT data. This IRT data is subject to particularly stringent realtime requirements, which is to say that a deterministic characteristic is expected of this data. The term 'SRT data' is to be understood as realtime data which is subject to less stringent realtime requirements than the IRT data. SRT data can be, for example, cyclical realtime data. The two data networks 40, 44 shown in FIG. 2 serve SRT data as a communication network. The third data network shown is, by contrast, an IRT data network 45 designed according to the rules and requirements of isochronous realtime communication. The SRT networks 40 and 44 are connected to IRT network 45 over communication connections 41 or, as the case may be, 43. The purpose of the dashed line in FIG. 2 is to represent the routing of an SRT data telegram 42 through IRT data network 45. An SRT data telegram 42 is customarily routed through said network according to the rules of IRT data network 45.

Figure 3:
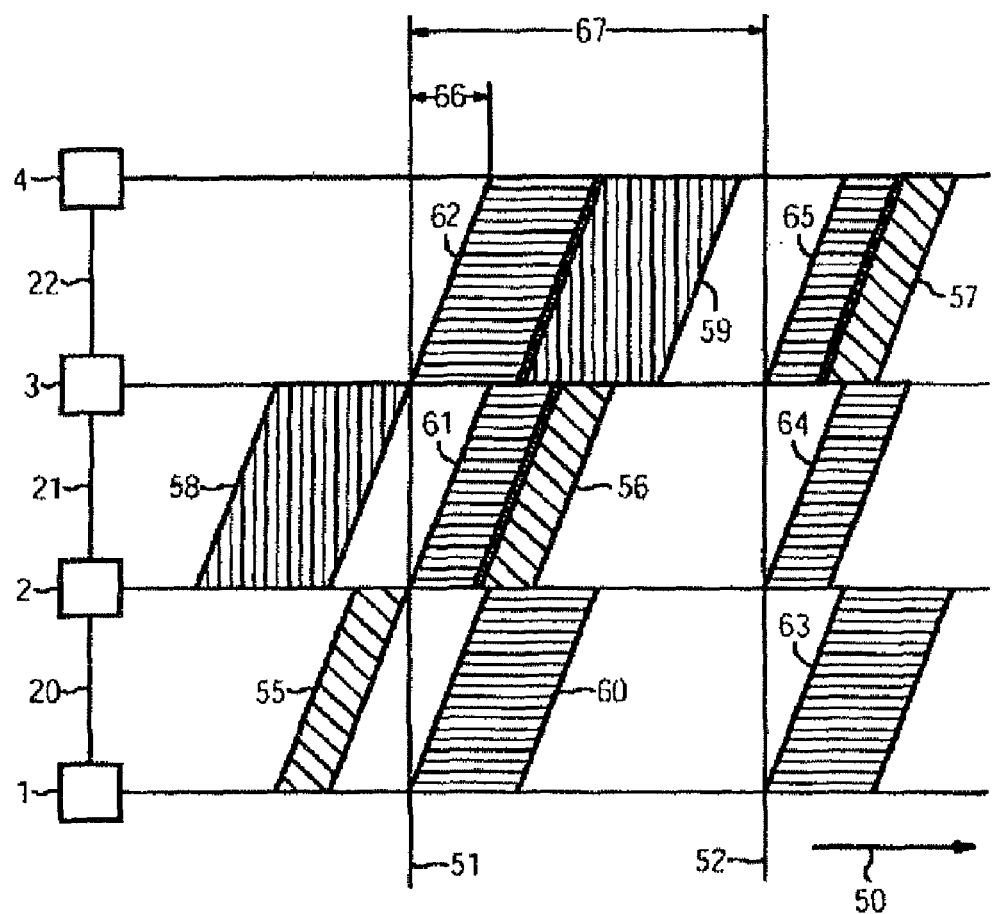
FIG. 3 is a schematic of an instance of communication between users in a conventional data network.

FIG. 3 is a schematic of an instance of communication between users in a conventional data network. It shows four users 1-4 connected linearly over point-to-point communication connections. The four users 1-4 could, for example, correspond to users 1-4 embodied as switching elements in data network 15 shown in FIG. 1, and so are identified here with the same reference numbers. Also shown schematically in a place-time diagram are data telegrams exchanged between users 1-4. The data telegrams, referred to below for short as telegrams 55 to 65, are transmitted from user 1 over communication connection 20 to user 2, from user 2 over communication connection 21 to user 3 or, as the case may be, from user 3 over communication connection 22 to user 4. The horizontal axis in the direction of advancing time of the place-time diagram is characterized with time arrow 50. The dashed vertical lines 51 and 52 accordingly in each case characterize a discrete time in the place-time diagram. The schematic in the place-time diagram shows various types of telegram characterized by different hatching. In the case of the communication shown here within an IRT network, IRT telegrams 60-62 and 63-65 start in each case at the same time 51 or, as the case may be, 52. SRT telegrams 55-57 are also routed through the IRT data network like NRT telegrams 58, 59 (NRT telegrams: Non Realtime Telegrams, which is to say telegrams whose transmission is not subject to any realtime requirements).

Various functions within internet-Ethernet communication make it necessary for transmission within a network to be as calculable as possible. The possible collision-waiting situations on the lines (in the case of shared-medium networks or in the switches in the case of switched networks) result in a not-deterministic characteristic. Although the introduction of priorities for realtime traffic in a network with a large number of switches with spontaneous and cyclical but uncoordinated communication produces an averagely satisfactory transmission time, situations nonetheless arise in which high-priority messages are significantly delayed. The previously known methods require what is termed 'scheduling'. This avoids waiting situations. In the case of shared-medium networks, each user must adhere to said scheduling. This, however, makes it impossible to connect any users no matter which with already existing hardware or, as the case may be, software. In the case of switched networks it suffices when all participating switches enforce said scheduling. This makes it possible to connect any end-users no matter which. A method known for this is the above-mentioned IRT communication. Although said method can be employed for any topologies, it requires filing of the planning data of the deterministic communication traffic not only at the participating end nodes but in all participating routing switches. Moreover, although a simple node could be attached to an IRT system, this is not possible for a group of simple devices over a conventional switch. Moreover, elaborate and time-critical special software has to be developed even in the case of simple nodes. If further realtime data, in particular cyclical realtime data, is injected into an IRT network on an uncoordinated basis, blocking of normal message traffic will cause delays at the end of an IRT cycle. After the IRT phase, which can be of differing length for different users, another lower-priority message can be sent in the case of one user while an IRT phase is still in progress in the case of another.

This frequently occurring problem of communication within an IRT data network, in particular in the case of the routing of SRT telegrams through the IRT data network shown in FIG. 2, will be explained below with the aid of FIG. 3. In order to meet the realtime requirements, particularly when IRT data packets are being transmitted, within a switched data network, the data telegrams are customarily transmitted on a planned basis in terms of time flow, which is to say with the application of what is termed 'scheduling'. A provision of scheduling in an IRT data network is that all users 1-4 in the data network transmit the highest-priority IRT data telegrams 60-62 or, as the case may be, 63-65 at pre-defined times 51 and 52. The discrete times 51 and 52 are separated by a defined time interval 67. This thus results in cyclically repeating transmission intervals beginning in each case with an IRT phase for transmitting IRT data telegrams, which is immediately followed by a second phase provided for transmitting less time-critical data telegrams. Scheduling prevents SRT telegrams 55 and NRT telegrams 58, 59 from being transmitted between users 1-4 during the IRT phase at the start of a transmission cycle. In the example in FIG. 3, both SRT telegram 55 and NRT telegram 58 must therefore be buffered at the time 51 in user 2 or, as the case may be, 3, so that the highest-priority IRT data telegrams 61 or, as the case may be, 62 can be transmitted. When IRT telegrams 60-62 and 63-65 have been transmitted, the remaining time within the transmission cycle can be used for transmitting SRT telegrams 55-57 or, as the case may be, NRT telegrams 58, 59. In this case, therefore, SRT telegram 56 is forwarded from user 2 to user 3 after NRT telegram 61, and NRT telegram 59 is correspondingly forwarded from user 3 to user 4 after IRT telegram 62. The routing times through users 1-4 and the transmission times over communication connections 20-22 are shown in FIG. 3 by the time difference 66 between the send and receive time. To obtain as good a realtime characteristic as possible for the communication network, it would be desirable also for the high-priority SRT telegrams 55-57, as well as the highest-priority IRT telegrams 60-65, to be routed through the data network with minimum delay. It must be said, however, that the scheduling shown in the example in FIG. 3 cannot prevent transmission of SRT telegram 56 in the same transmission cycle from being blocked by transmission of NRT data telegram 59. User 3 can only forward SRT telegram 57 to user 4 in the next transmission cycle, with higher-priority IRT telegram 65 being transmitted first. The consequent undesired transmission sequence in the IRT data network is due to the common start times of IRT telegrams 60-62 customarily provided by the scheduling and the different length of said IRT telegrams 60-62.

Figure 4:
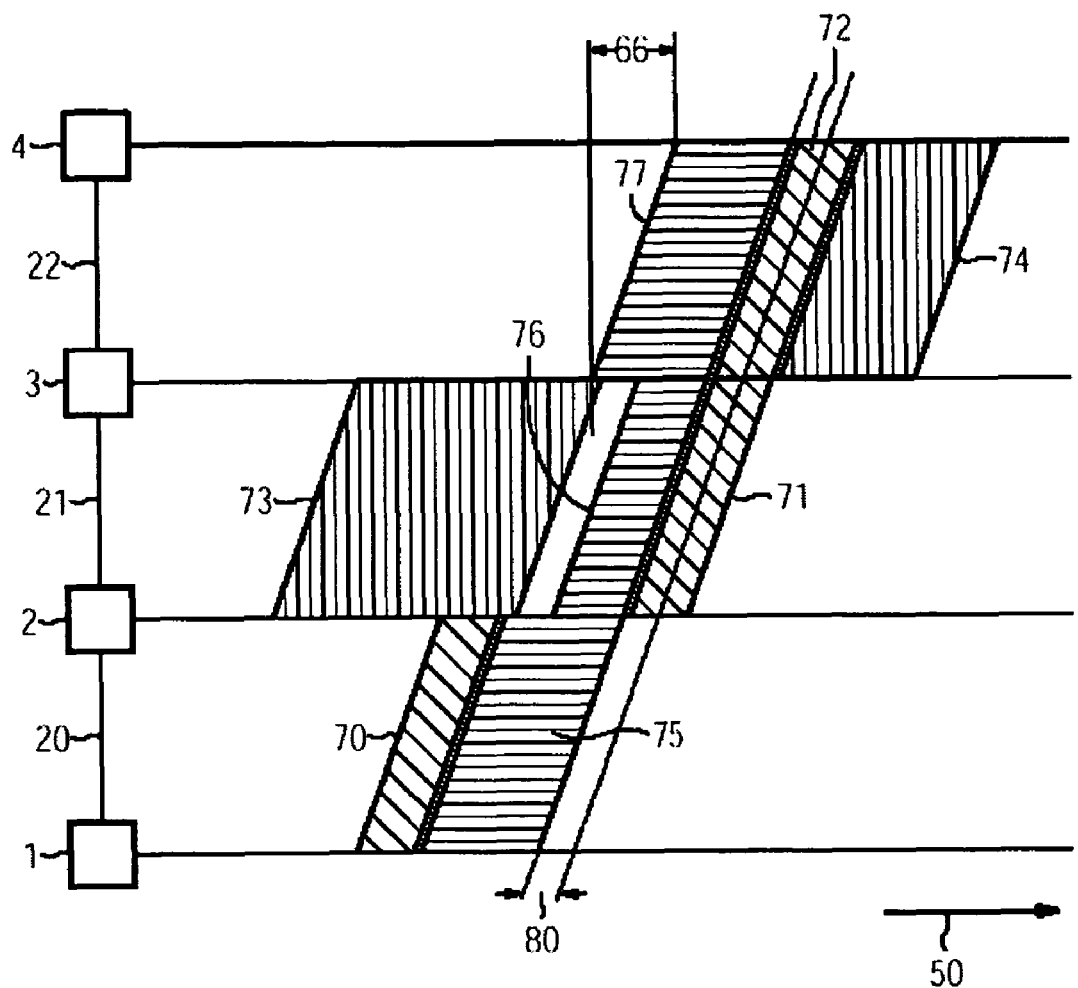
FIG. 4 is a schematic of an instance of communication between users in a system according to an exemplary embodiment of the invention.

FIG. 4 is a schematic of an instance of communication between users in a system according to an exemplary embodiment of the invention. FIG. 4 shows, analogously to FIG. 3, a switchable data network with users 1-4 connected through communication connections 20-22, and a place-time diagram to illustrate the transmission of data telegrams 70-77. In contrast to the embodiment of the data network in FIG. 3, communication in the data network according to FIG. 4 does not take place in accordance with the previously described customary rules of an IRT data network. Communication between users 1-4 also takes place in the case of the exemplary embodiment of the invention shown here in accordance with a planned time flow, which is to say with the application of what is termed 'scheduling'. However, appropriately optimized scheduling is employed to avoid the problems depicted with the aid of the example in FIG. 3 associated with the routing of SRT telegrams through an IRT data network. As the lengths of telegrams 70-77 being transmitted are known in the system and hence in the individual users 1-4, the transmission of an IRT telegram 75-77 can be planned and implemented in such a way that the time of the end of transmission of an IRT telegram 75-77 in the respectively receiving user 2-4 and hence also the time of the end of the first phase is defined. A time defined in this way of the end of the first phase could, for example, be the same time for all users, which is to say the transmission of all IRT telegrams 75-77 in the data network ends at the same previously defined time (not shown in FIG. 4). If the respective routing times 66 are additionally taken into consideration, it is possible to achieve an end of transmission of the respective IRT telegrams 75-77 which appears flush in the place-time diagram. In this case the defined times of the end of transmission of an IRT telegram 75-77 in the respectively receiving user 2-4 and hence also the times of the end of the first phase in the receiving user are therefore in each case displaced by the routing times 66 in relation to the respective time at the sending user. A waiting time 80 during which the forwarding of NRT telegrams 74 is prevented is provided immediately following the thus optimized IRT phase. SRT telegrams 71, 72 are, however, forwarded in this phase. Users 1-4 forward receiving [sic] SRT telegrams 71, 72 as quickly as possible using the cut-through method. Thanks to the cut-through method, the delay experienced by the telegrams when being routed is minimized. This is achieved by simultaneous evaluation of an arriving telegram 71, 72 by user 1-4. Despite not having been completely received, the telegram can already be sent again on an appropriate port of the respective user 1-4 when the destination address has been properly recognized. The fastest possible routing of high-priority SRT telegrams 70-72 through an IRT system is achieved thanks to the end-isochronous transmission of IRT telegrams 75-77, in particular in combination with the definition of a waiting time 80 before NRT telegrams 73, 74 are routed.

To summarize, the invention thus relates to a method and system for transmitting data in a switchable data network and to a user 1-4 in a switchable data network. To improve the transmission of data having different priority in the switchable data network, it is proposed assigning data telegrams 70-77 priorities, with said telegrams 70-77 in each case having a beginning and an end, with data telegrams 75-77 that were assigned a first priority being sent during a first phase from first users 1-3 to second users 2-4, with the first phase being characterized by means of a defined receive time of the end of the respective data telegram 75-77 at the second user 2-4.

The invention claimed is:

1. A method for transmitting data in a switchable data network, comprising:
   assigning priorities for transmission in the switchable data network to each in a plurality of data telegrams each having a beginning and an end, some of the data telegrams assigned a first priority; and
   sending the data telegrams which are assigned the first priority, during a first phase of a transmission cycle, from first users to second users in the switchable network wherein the first phase is characterized by an end time based on a defined receive time of the end of a data telegram having the first priority at one of the second users.

2. A method according to claim 1, wherein only data telegrams assigned a second priority are sent in a second phase after the end of the first phase.

3. A method according to claim 2, wherein data telegrams assigned any priority are sent in a third phase after the end of the second phase.

4. A method according to claim 2, wherein the first phase is cyclically repeated.

5. A method according to claim 2, wherein data telegrams with realtime data are assigned the first priority.

6. A method according to claim 1, wherein the first phase is followed by a second phase and data telegrams assigned any priority are sent in a third phase after an end of the second phase.

7. A method according to claim 6, wherein the first phase is cyclically repeated.

8. A method according to claim 6, wherein data telegrams with realtime data are assigned the first priority.

9. A method according to claim 1, wherein the transmission cycle is cyclically repeated with the first phase in each transmission cycle having an end time based on a defined receive time of the end of a data telegram by a second user.

10. A method according to claim 9, wherein data telegrams with realtime data are assigned the first priority.

11. A method according to claim 1, wherein data telegrams with realtime data are assigned the first priority.

12. The method of claim 1 wherein the end time of the first phase is based on the length of the data telegram.

13. The method of claim 12 wherein for at least one cycle the end time of the first phase for each user is also based on routing time to each user receiving a data telegram of the first priority so that the end time of the first phase in the at least one cycle differs among users receiving data telegrams based on routing times.

14. A system for transmitting data in a switchable data network, comprising users having mechanisms for sending, receiving, or forwarding data telegrams in the switchable network, wherein the data telegrams each have a beginning and an end and wherein the telegrams are assigned priorities, wherein data telegrams assigned a first priority are sent from first users to second users in the switchable network during a first phase with the first phase being characterized by an end based on a pre-defined receive time of the end of each sent data telegram at one of the second users.

15. A system according to claim 14, wherein the first users are provided with a second phase after the end of the first phase for exclusively sending data telegrams assigned a second priority to the second users.

16. A system according to claim 15, wherein the first users are provided during a third phase after the end of the second phase for sending data telegrams assigned any priority to the second users.

17. A system according to claim 15, wherein the system for transmitting realtime data is provided in the switchable data network, with the realtime data being assigned the first priority.

18. A system according to claim 14, wherein a second phase follows the first phase and the first users are provided with a third phase after an end of the second phase for sending data telegrams assigned any priority to the second users.

19. A system according to claim 14, wherein the system for transmitting realtime data is provided in the switchable data network, with the realtime data being assigned the first priority.

20. A switchable data network comprising mechanisms for sending, receiving, or forwarding data telegrams during cyclical transmission intervals, wherein the data telegrams each have a beginning and an end and wherein the data telegrams transmitted in the switchable network are assigned priorities, wherein a first usable portion of a transmission interval in the network is used during a first phase for sending data telegrams assigned a first priority from a first user to one or more second users, with the first phase having an end based on a pre-defined receive time for receipt of the end of a data telegram assigned the first priority at one of the second users.

* * * * *